United States Patent
Wright et al.

(10) Patent No.: US 10,558,423 B1
(45) Date of Patent: Feb. 11, 2020

(54) SYSTEMS AND METHODS FOR CONTROLLING VOLUME

(71) Applicant: Control4 Corporation, Salt Lake City, UT (US)

(72) Inventors: Troy Wright, West Jordan, UT (US); David Acton, Sandy, UT (US)

(73) Assignee: WirePath Home Systems, LLC, Charlotte, NC (US)

( * ) Notice: Subject to any disclaimer, the term of this patent is extended or adjusted under 35 U.S.C. 154(b) by 0 days.

(21) Appl. No.: 16/294,188

(22) Filed: Mar. 6, 2019

(51) Int. Cl.
*H03G 3/00* (2006.01)
*G06F 3/16* (2006.01)
*H04S 7/00* (2006.01)
*G06F 9/30* (2018.01)

(52) U.S. Cl.
CPC .............. *G06F 3/165* (2013.01); *G06F 3/162* (2013.01); *G06F 9/3004* (2013.01); *H04S 7/301* (2013.01); *H04S 2400/13* (2013.01)

(58) Field of Classification Search
CPC ........ G06F 3/165; G06F 3/162; G06F 9/3004; H04S 7/301
See application file for complete search history.

(56) References Cited

U.S. PATENT DOCUMENTS

| | | | |
|---|---|---|---|
| 2004/0005068 A1* | 1/2004 | Zeevi | H04S 3/00 381/107 |
| 2011/0200210 A1* | 8/2011 | Kemmochi | H04M 9/082 381/107 |
| 2016/0316064 A1* | 10/2016 | Ohman | H04M 3/568 |
| 2018/0167473 A1* | 6/2018 | Gierada | H04L 67/22 |
| 2018/0212579 A1* | 7/2018 | Hwang | H03G 3/3005 |
| 2019/0163153 A1* | 5/2019 | Price | G05B 19/045 |

* cited by examiner

*Primary Examiner* — Simon King
(74) *Attorney, Agent, or Firm* — Austin Rapp

(57) ABSTRACT

An electronic device for controlling volume is described. The electronic device includes a processor. The electronic device also includes a memory in electronic communication with the processor. The electronic device further includes instructions stored in the memory. The instructions are executable by the processor to determine, from a set of volume settings, a number of volume settings within a threshold. The instructions are also executable by the processor to determine a volume adjustment factor based on the number of volume settings. The instructions are further executable by the processor to adjust each of the number of volume settings based on the volume adjustment factor.

20 Claims, 9 Drawing Sheets

SYSTEMS AND METHODS FOR CONTROLLING VOLUME

TECHNICAL FIELD

The present disclosure relates generally to electronic devices. More specifically, the present disclosure relates to systems and methods for controlling volume.

BACKGROUND

In recent years, the price of electronic devices has decreased dramatically. In addition, the size of electronic devices has continued to decrease. Further, electronic devices continue to increase in capability and convenience.

Decreasing prices and increasing capabilities of electronic devices has permitted modern devices to be conveniently used in homes and businesses. Many homes and businesses include multiple electronic devices to assist in everyday tasks. For example, electronic devices may be used for convenience and/or entertainment.

While some electronic devices may provide convenience and entertainment, many also require control. Safety is also a concern with some electronic devices. As can be observed from this discussion, improvements to electronic device ease of use and/or safety may be beneficial.

DETAILED DESCRIPTION

Figure 1:
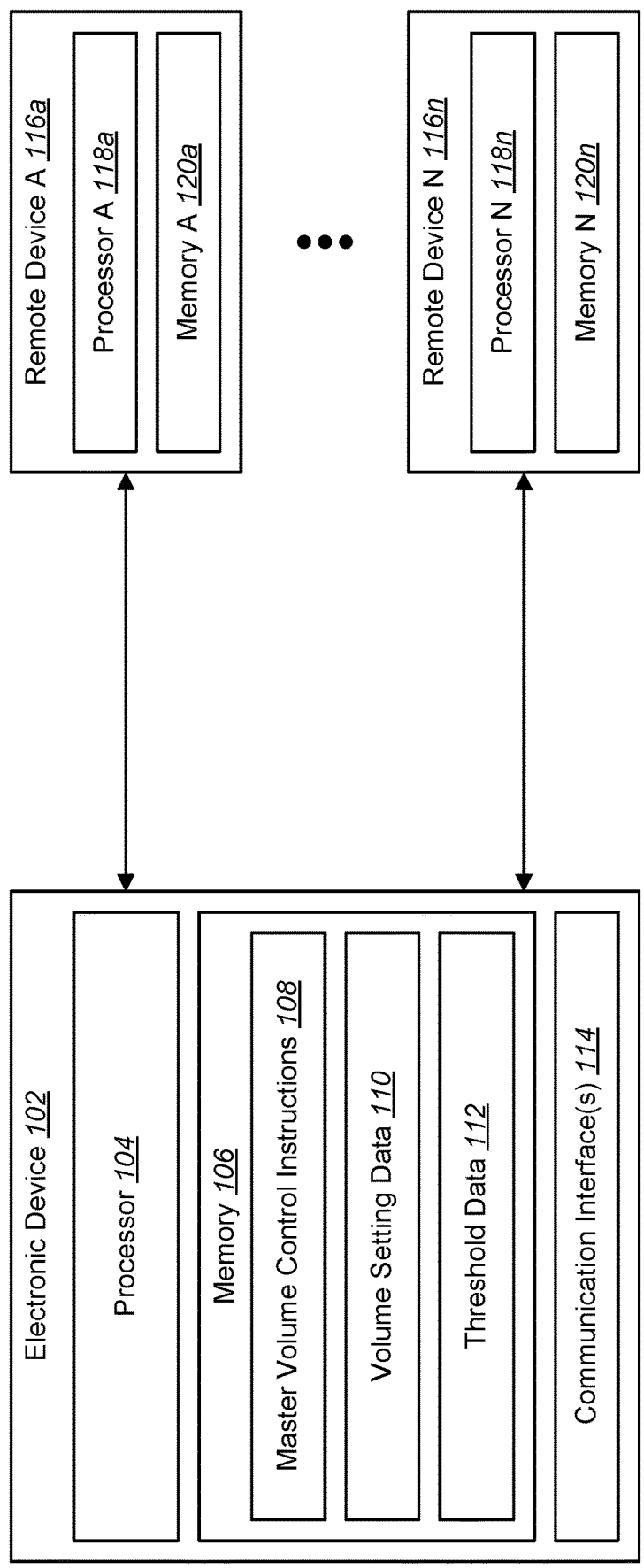
FIG. 1 is a block diagram illustrating one example of an electronic device in which systems and methods for controlling volume may be implemented.

An electronic device for controlling volume is described. The electronic device includes a processor. The electronic device also includes a memory in electronic communication with the processor. The electronic device further includes instructions stored in the memory. The instructions are executable to determine, from a set of volume settings, a number of volume settings within a threshold. The instructions are also executable to determine a volume adjustment factor based on the number of volume settings. The instructions are further executable to adjust each of the number of volume settings based on the volume adjustment factor.

The instructions may be further executable to determine a total volume distance based on the threshold and the set of volume settings. The instructions may be executable to determine the volume adjustment factor based on the total volume distance. The volume adjustment factor may be uniform for the number of volume settings.

The number of volume settings may include any of the set of volume settings that is not at the threshold. The number of volume settings may be a number of areas with remote devices that are not set at the threshold. The instructions may be further executable to allow the set of volume settings to move beyond the threshold only after all of the set of volume settings have arrived at the threshold.

The instructions may be executable to limit a rate of volume increase over time. The instructions may be executable to queue one or more volume waypoints for an increasing volume indicator. The instructions may be executable to discard at least one of the one or more volume waypoints and set a lower volume in response to a volume indicator that is lower than the at least one of the one or more volume waypoints.

The instructions may be executable to determine the volume adjustment factor in accordance with an equation $$X = D * \left( \frac{T_D}{n_T * (V_T - V_M)} \right).$$

X may be the volume adjustment factor, D may be an adjustment direction, $T_D$ may be a total volume distance, $n_T$ may be the number of volume settings within the threshold, $V_T$ may be the threshold, and $V_M$ may be a master volume setting.

A method for controlling volume is also described. The method includes determining, from a set of volume settings, a number of volume settings within a threshold. The method also includes determining a volume adjustment factor based on the number of volume settings. The method further includes adjusting each of the number of volume settings based on the volume adjustment factor.

A non-transitory computer-readable medium for controlling volume is also described. The computer-readable medium includes executable instructions for determining, from a set of volume settings, a number of volume settings within a threshold. The computer-readable medium also includes executable instructions for determining a volume adjustment factor based on the number of volume settings. The computer-readable medium further includes instructions for adjusting each of the number of volume settings based on the volume adjustment factor.

Some configurations of the systems and methods disclosed herein may relate to controlling volume. For instance, some configurations of the systems and methods disclosed herein may relate to uniformly controlling whole-home-audio volume. Some examples of the systems and methods disclosed herein may provide speaker protection. For instance, volume levels of different devices (e.g., remote devices, audio devices, etc.) may be controlled with a slider while protecting speakers from damage (in a case when the slide is accidentally dragged to 100%, for example).

Some configurations of the systems and methods described herein may allow multiple audio devices at different volume levels to be represented by a master volume slider. When the master slider is moved, volume levels in the different devices may change uniformly such that the volume levels may increase or decrease by the same volume percentage. For example, this approach may allow uniformly changing the volume levels of audio devices playing throughout a house such that the volume levels increase or decrease approximately equally (e.g., by a same percentage amount).

One difficulty in representing multiple volume levels (e.g., volume levels of multiple devices) with one slider is that each device may be at a different volume percentage. In some approaches, the slider to control all of the devices may be set at an average of all the volume percentages. For example, assume three audio devices, where device A is at 30% volume, device B is at 50% volume, and device C is at 70% volume. The slider may enable volume to be controlled from 0 to 100%, and may have a position at the average of all the device volume levels (i.e., 50%). One problem with one slider controlling multiple devices at different levels may occur as follows: the slider is at 50%, but the two of the devices are set to 30% and 70%. Accordingly, if the slider is moved to 100%, the device that started at 30% will be stuck at 80%. Moreover, if the slider is moved to 0%, the device that started at 70% will be stuck at 20%.

One approach to this problem is to have the volume levels of the devices move at non-uniform rates to converge at either 0% or 100% depending on which direction the slider is moving. In this approach, as the slider is moved towards 100%, the device that started at 30% increases in volume much more rapidly than the device that started out at 80%. Accordingly, if all of the devices have to converge at the same end point at the same time, they increase or decrease at different rates. Therefore, the volume levels of the different devices change non-uniformly. This approach may lead to poor performance in some cases. For example, movement of the slider may cause a larger than desired change in volume for one device, while causing a smaller than desired change in volume for another device.

As used herein, the term "couple" and other variations thereof (e.g., "coupled," "coupling," etc.) may mean that one element is connected to another element directly or indirectly. For example, if a first element is coupled to a second element, the first element may be connected directly to the second element (without any intervening element, for example) or may be connected to the second element through one or more other elements. Some lines in one or more of the Figures (e.g., in the block diagrams) may indicate couplings and/or communication links (e.g., wired or wireless communication links).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. As used herein, the term "plurality" may indicate two or more. For example, a plurality of components may refer to two or more components. As used herein, element numbers with letters may be utilized to refer to multiple instances of an element, device, or object (e.g., "remote devices 116a-n"). When a corresponding element number is used without a letter (e.g., "remote device 116"), the element number may generally denote any, one, some, or all of the elements, devices, or objects to which the element number refers.

FIG. 1 is a block diagram illustrating one example of an electronic device 102 in which systems and methods for controlling volume may be implemented. Examples of the electronic device 102 include home controllers, audio/video receivers, servers, computers (e.g., desktop computers, laptop computers, etc.), network devices, gaming consoles, smart televisions, smartphones, tablet devices, vehicles, automobiles, aircraft, appliances, etc. In some configurations, the electronic device 102 may be located in a building, home, business, vehicle, etc., and/or may be integrated into one or more devices (e.g., vehicles, mobile devices, etc.). The electronic device 102 may include one or more components or elements. One or more of the components or elements may be implemented in hardware (e.g., circuitry), a combination of hardware and software (e.g., a processor with instructions), and/or a combination of hardware and firmware.

In some configurations, the electronic device 102 may include a processor 104, a memory 106, and/or one or more communication interfaces 114. The processor 104 may be coupled to (e.g., in electronic communication with) the memory 106 and/or communication interface(s) 114.

In some configurations, the electronic device 102 may be configured to perform one or more of the functions, procedures, methods, steps, etc., described in connection with one or more of FIGS. 1-9. Additionally or alternatively, the electronic device 102 may include one or more of the structures described in connection with one or more of FIGS. 1-9.

The memory 106 may store instructions and/or data. The processor 104 may access (e.g., read from and/or write to) the memory 106. Examples of instructions and/or data that may be stored by the memory 106 may include master volume control instructions 108, volume setting data 110, threshold data 112, and/or instructions and/or data for other elements, etc.

The communication interface 114 may enable the electronic device 102 to communicate with one or more other electronic devices (e.g., remote devices A-N 116a-n and/or one or more other electronic devices). For example, the communication interface 114 may provide an interface for wired and/or wireless communications. In some configurations, the communication interface 114 may be coupled to one or more antennas for transmitting and/or receiving radio frequency (RF) signals. For example, the communication interface 114 may enable one or more kinds of wireless (e.g., cellular, wireless local area network (WLAN), personal area network (PAN), etc.) communication. Additionally or alternatively, the communication interface 114 may enable one or more kinds of cable and/or wireline (e.g., Universal Serial Bus (USB), Ethernet, High Definition Multimedia Interface (HDMI), fiber optic cable, etc.) communication.

In some configurations, multiple communication interfaces 114 may be implemented and/or utilized. For example, one communication interface 114 may be an Ethernet interface, another communication interface 114 may be a universal serial bus (USB) interface, another communication interface 114 may be a wireless local area network (WLAN) interface (e.g., Institute of Electrical and Electronics Engineers (IEEE) 802.11 interface), and another communication interface 114 may be a cellular (e.g., 3G, Long Term Evolution (LTE), Code-Division Multiple Access (CDMA), etc.) communication interface 114.

In some configurations, the electronic device 102 may communicate with one or more remote devices 116a-n, one or more control devices, and/or one or more other electronic devices. For example, the electronic device 102 may utilize the communication interface(s) 114 to communicate with the one or more remote devices 116a-n, one or more control devices, and/or one or more other electronic devices. In some configurations, one or more of communications may be carried out over a network (e.g., WLAN, Zigbee, etc.) or over a direct wired or wireless link.

One or more of the remote devices 116a-n may include a respective processor 118a-n and memory 120a-n. For example, each of the remote devices 116a-n may include executable instructions for controlling media output (e.g., local media control instructions, such as local volume control instructions, media selection instructions, media play instructions, media stop instructions, media skip instructions, media pause instructions, etc.) and/or executable instructions for implementing media control commands from the electronic device 102.

Examples of the remote devices 116a-n may include audio/video receivers, smart phones, tablet devices, computers, media servers, smart speakers, media players, etc. The remote devices 116a-n may control, source, play, and/or distribute audio. One example of the remote devices 116a-n may be an audio/video receiver that receives audio from the electronic device 102 may sources the audio to one or more speakers. Another example of the remote devices 116a-n may be a smart phone that plays audio on a set of linked speakers as directed by the electronic device 102. Another example of the remote devices 116a-n may be a media server that plays audio on a set of linked speakers as directed by the electronic device 102. Another example of the remote devices 116a-n may be a smart speaker that plays audio as directed by the electronic device 102. In some configurations, each of the remote devices 116a-n may correspond to an area. For example, each of the remote devices 116a-n may correspond to a room in a building (e.g., home, business, etc.) and/or to a zone (e.g., zone in a vehicle cabin, zone in an airplane cabin, zone in a showroom, zone in a theater, etc.). For instance, each of the remote devices 116a-n may locally control audio that is played on one or more speakers in an area.

In some configurations, the communication interface(s) 114 may send information (e.g., volume setting data 110, volume adjustment commands, media information, media signals, audio data, video data, play commands, pause commands, stop commands, skip commands, fast forward commands, rewind commands, synchronization information, user interface information, images, interactive object information, etc.) to another electronic device (e.g., one or more remote devices A-N 116a-n, audio/video receivers, stereo systems, smart speakers, smartphones, tablet devices, media servers, game consoles, televisions, and/or other electronic device(s), etc.) and/or receive information (e.g., volume setting data 110, threshold data 112, operation status data, volume adjustment indicators, volume adjustment inputs, interface events, taps, clicks, keypad data, keyboard data, etc.) from another electronic device (e.g., one or more remote devices A-N 116a-n, audio/video receivers, stereo systems, smart speakers, smartphones, tablet devices, media servers, touchscreens, touchpads, keyboards, keypads, mice, and/or other electronic device(s), etc.).

In some configurations, the electronic device 102 may be in communication with a control device (e.g., smart phone, tablet device, control panel, smart television, smart watch, computer, laptop, server, etc.) that may provide control information to the electronic device 102. For example, a control device may include a user interface for controlling one or more operations of and/or settings for the electronic device 102. For instance, the control device may include a user interface that presents interactive controls (e.g., sliders, knobs, buttons, number fields, text fields, etc.). The control device may receive input (e.g., touchscreen input, taps, drags, mouse clicks, keypad input, virtual keyboard input, physical keyboard input, camera input, gestures, eye movements, blinks, etc.) associated with one or more operations and/or settings. The control device may send control information (e.g., volume adjustment indicators, volume adjustment inputs, settings indicators, threshold indicators, play indicators, pause indicators, stop indicators, skip indicators, fast forward indicators, rewind indicators, etc.) to the electronic device 102. The electronic device 102 may utilize the control information to perform one or more operations and/or adjust one or more settings.

In some configurations, the electronic device 102 may include and/or may be linked to one or more displays. The display(s) may present visual content (e.g., user interface, images, video, graphics, symbols, characters, etc.). The display(s) may be implemented with one or more display technologies (e.g., liquid crystal display (LCD), organic light-emitting diode (OLED), plasma, cathode ray tube (CRT), etc.). The display(s) may be integrated into the electronic device 102 or may be coupled to the electronic device. For example, the electronic device 102 may be a home controller that is linked to one or more control panels with the displays.

In some configurations, the electronic device 102 may present a user interface on the display(s). For example, the user interface may enable a user to interact with the electronic device 102. For instance, the user interface on the display may present interactive controls (e.g., sliders, knobs, buttons, number fields, text fields, etc.). The electronic device 102 may receive input (e.g., touchscreen input, taps, drags, mouse clicks, keypad input, virtual keyboard input, physical keyboard input, etc.) associated with one or more operations and/or settings. The electronic device 102 may utilize the input to perform one or more operations and/or adjust one or more settings. For example, the input(s) may correspond to volume adjustment indicators. In some configurations, the display may be a touchscreen that receives input from physical touch (by a finger, stylus, or other tool, for example). Additionally or alternatively, the electronic device 102 may include or be coupled to another input interface. For example, the electronic device 102 may include a camera and may detect user gestures (e.g., hand gestures, arm gestures, eye tracking, eyelid blink, etc.). In another example, the electronic device 102 may be linked to a mouse and may detect a mouse click. In yet another example, the electronic device 102 may be linked to one or more other controllers (e.g., game controllers, joy sticks, touch pads, motion sensors, etc.) and may detect input from the one or more controllers.

As described herein, the processor 104 may execute instructions stored in the memory 106. In some configurations, the processor 104 may execute master volume control instructions 108 to perform master volume control. Master volume control may allow the electronic device 102 to control volume settings for multiple remote devices 116a-n. For example, master volume control may enable the electronic device 102 to concurrently control volumes (e.g., local volume levels) for all of the remote devices 116a-n that are active. In some configurations, the electronic device 102 may receive an input or indicator (via a user input or from a control device, for example) to adjust a master volume setting. In some examples, the input or indicator may be based on a user interface input (e.g., a slider movement, a knob turn, number entry, up arrow input, down arrow input, plus or minus input, etc.). The master volume setting may be utilized to adjust respective volume settings for each of the remote devices 116a-n. For example, the processor 104 may execute the master volume control instructions 108 to produce adjusted volume settings for each of the remote devices 116a-n based on an adjustment to the master volume setting. In some configurations, the master volume setting may be initialized to a value between the highest volume setting (for a remote device 116) and the lowest volume setting (for another remote device 116). For example, the master volume setting may be initialized to an average of all of the volume settings (for the remote devices 116a-n).

The master volume setting and/or volume settings for the remote devices 116a-n may be stored as volume setting data 110 in the memory 106. For example, the volume setting data 110 may include data (e.g., numerical data, a percentage, etc.) representing the master volume setting and data (e.g., numerical data, percentages, etc.) representing a set of volume settings for the remote devices 116a-n. The set of volume settings may include the volume settings for all of the remote devices 116a-n (e.g., all of the remote devices 116a-n that are active and responsive to media control commands).

The memory 106 may store threshold data 112. The threshold data 112 may indicate one or more thresholds. Each of the thresholds may represent a volume limit. Some examples of thresholds may represent maximum and minimum volume capabilities. For instance, one example of a threshold may be 100% volume and another example of a threshold may be a 0% volume. Other examples of thresholds may include other thresholds (e.g., 30%, 40%, 50%, 60%, 70%, 75%, 80%, 90%, etc.). A threshold may be absolute (e.g., "hard") or conditional (e.g., "soft"). An absolute threshold may not be passed. For example, the electronic device 102 may not allow volume adjustment beyond an 80% absolute threshold, but may allow volume adjustment beyond an 80% conditional threshold if a condition is met. The value of a threshold and/or the type (e.g., absolute or conditional) of a threshold may be predetermined and/or may be set based on a user input (e.g., a technician, installer, consumer, etc., may set or adjust the threshold(s)) and/or a received indicator. In some configurations, the threshold may be set to prevent speaker damage. For example, the threshold may be set such that speaker damage will not occur at volumes at or below the threshold. Accordingly, some configurations of the systems and methods described herein may allow for upper and/or lower volume thresholds to be user-defined.

In some configurations of the systems and methods disclosed herein, the processor 104 may execute the master volume control instructions 108 to determine a volume adjustment factor. The volume adjustment factor is a value or number that indicates a degree of volume setting adjustment for one or more of the remote devices 116a-n relative to an adjustment in the master volume setting. For example, the volume adjustment factor may indicate an amount of adjustment for a volume setting of one of the remote devices 116 for each adjustment step (e.g., percent) of the master volume setting. In some configurations, the volume adjustment factor may be initialized to one. With a volume adjustment factor of one, for example, each of the volume settings for the remote devices 116a-n may be adjusted by the same amount as the master volume setting.

As described above, one problem with some approaches to volume control is non-uniform control, where volumes for different devices may be adjusted non-uniformly (e.g., at different rates) in relation to each other. While this approach may allow for different devices to end adjustment at 100%, it may cause different devices to have very different volume adjustment behavior (e.g., one device increases in volume by 4% while another increases in volume by 20%).

In accordance with some configurations of the systems and methods disclosed herein, the processor 104 may execute the master volume control instructions 108 to determine a volume adjustment factor based on a number of volume settings within a threshold. This may allow volume settings (of the remote devices 116a-n) within the threshold to be adjusted uniformly.

In some configurations, the processor 104 may execute the master volume control instructions 108 to determine, from a set of volume settings, a number of volume settings within a threshold (or within a volume range). For example, the processor 104 may determine a number of the set of volume settings that are less than the threshold (for an upper threshold) or that are greater than the threshold (for a lower threshold). In some configurations, the processor 104 may determine the number of volume settings within the threshold by counting those volume settings that are not equal to the threshold (or by subtracting a number of volume settings at the threshold from a total number of volume settings, for example). The number of volume settings may include any of the set of volume settings that is not at the threshold. For instance, assuming a threshold of 100% and assuming that there are three remote devices 116 with corresponding volume settings of 60%, 80%, and 100%, the processor 104 may determine that there are two volume settings within the threshold. In some configurations, the number of volume settings may be a number of areas with remote devices 116 that are not set at the threshold. It should be noted that while percentages are given as examples to represent volume levels herein, other scales or indicators may be utilized in accordance with the systems and methods disclosed herein.

The processor 104 may execute the master volume control instructions 108 to determine the volume adjustment factor based on the number of volume settings. For example, the processor 104 may vary the volume adjustment factor based on the number of volume settings within the threshold. The volume adjustment factor may be uniform for the number of volume settings (that are within the threshold, for example). For instance, the same volume adjustment factor may be applied to each of the remote devices 116 that have not reached the threshold. This approach may enable each of the remote devices 116 that have not reached the threshold to be adjusted uniformly (e.g., at the same rate). In some configurations, determining the volume adjustment factor may be performed in response to at least one of the volume settings reaching the threshold. For example, the processor 104 may monitor the volume settings and/or may predict (based on a master volume setting adjustment, for example) for a volume setting to reach the threshold. When the threshold is reached by a volume setting, the processor 104 may determine (e.g., calculate, re-compute, update, etc.) the volume adjustment factor.

In some configurations, the processor 104 may execute the master volume control instructions 108 to adjust each of the number of volume settings (e.g., each of the volume settings that were within the threshold) based on the volume adjustment factor. For example, the electronic device 102 may send volume adjustment commands to the remote devices 116 (that have not yet reached the threshold, for instance) to adjust volumes locally. For instance, assuming a volume adjustment factor of 1.5, assuming that remote device A 116a had a volume setting of 60% and that remote device N 116a had a volume setting of 80%, and assuming that the master volume setting is increased by 1%, the electronic device 102 may command remote device A 116a to increase volume to 61.5% and remote device N 116a to increase volume to 81.5%. In some configurations, volume settings at the threshold may not be adjusted. For example, if one or more volume settings (for remote device(s)) are already at the threshold, the processor 104 may not adjust that volume setting or settings.

In some configurations, the processor 104 may execute the master volume control instructions 108 to determine a total volume distance based on the threshold and the set of volume settings. A volume distance may be a difference between the threshold and the volume setting. For example, the processor 104 may add the volume distances for all of the volume settings (or for the volume settings within the threshold) to produce the total volume distance. In some configurations, the total volume distance may be expressed as given in Equation (1):

$$T_D = \sum_{i=1}^{N} V_T - S_i \qquad (1)$$

In Equation (1), $T_D$ is the total volume distance, $V_T$ is the threshold, $S_i$ is the volume setting for index i, and N is a total number of volume settings (e.g., a number of controllable remote devices 116a-n).

In some configurations, the processor 104 may execute the master volume control instructions 108 to determine the volume adjustment factor based on the total distance volume. For example, the processor 104 may determine the volume adjustment factor in accordance with Equation (2) in some configurations:

$$X = D * \left( \frac{T_D}{n_T * (V_T - V_M)} \right) \qquad (2)$$

In Equation (2), X is the volume adjustment factor, D is an adjustment direction (e.g., +1 for a volume increase or −1 for a volume decrease), $T_D$ is the total volume distance, $n_T$ is the number of volume settings within the threshold, $V_T$ is the threshold, and $V_M$ is a master volume setting.

In some configurations, the processor 104 may execute the master volume control instructions 108 to allow the set of volume settings to move beyond the threshold (for a conditional threshold, for example) only after all of the set of volume settings have arrived at the threshold. For example, assume a conditional threshold at 80%. None of the volume settings may be allowed to pass 80% until all of the volume settings are at 80%. Once all of the volume settings have arrived at 80%, the volume settings may be allowed to increase with an increase in the master volume setting. In some configurations, once all of the volume settings have reached, the volume adjustment factor may be set (e.g., reset) to one. Accordingly, the volume settings may concur with the master volume setting beyond the threshold in some configurations.

In some configurations, the processor 104 may execute the master volume control instructions 108 to limit a rate of volume increase over time. For example, limiting a rate a volume increase over time may be beneficial to prevent speaker damage or avoid sudden changes in volume. For instance, damage to a speaker may occur if the master volume setting (e.g., a user interface control such as a slider) is suddenly set to 100%. This scenario may be prevented by limiting the rate of volume increase over time. In some configurations, a maximum volume velocity setting may be utilized to restrict how quickly the volume can change (in the positive direction, for instance). For example, the maximum volume velocity setting may limit volume increase to 20% per second.

In some configurations, the processor 104 may execute the master volume control instructions 108 to queue volume waypoints. For example, volume waypoints may be prospective volume settings that are generated based on an indicated volume (e.g., input or received volume indicator). For instance, the processor 104 may generate a set of volume waypoints between a previous volume setting and an indicated volume setting. The electronic device 102 may send the volume waypoints to the remote devices 116a-n over time to ensure that the maximum volume velocity is not exceeded. In some configurations, the processor 104 may execute the master volume control instructions 108 to queue one or more volume waypoints for an increasing volume indicator. In some approaches, the processor 104 may execute the master volume control instructions 108 to discard the one or more volume waypoints and set a lower volume in response to a volume indicator that is lower than the one or more volume waypoints. For example, in a case that a volume adjustment indicator that is lower than a volume waypoint is obtained (before the volume has increased in accordance with all of the volume waypoints, for instance), the processor 104 may discard any remaining waypoint(s) (that is or are higher than the lower volume adjustment indicator) and adjust the volume in accordance with the lower volume adjustment indicator. It should be noted that the volume increase rate limiting may be applied to the master volume setting, the volume settings corresponding to the remote devices 116a-n, or both.

In some configurations, one or more of the components or elements described in connection with FIG. 1 may be combined and/or divided. For example, master volume control instructions 108 may be divided into a number of separate components or elements that perform a subset of the functions associated with the master volume control instructions 108.

It should be noted that the systems and methods disclosed herein may additionally or alternatively be applied to lighting. For example, instead of changing volume levels of devices, dimmer levels of lights may be changed. For instance, the electronic device 102 may be configured to control remote dimmers. The lighting levels of the dimmers may be controlled similarly to the volume settings as described herein. Accordingly, one or more of the functions, procedures, steps, methods, devices, etc., described herein may be alternatively applied to lighting. For example, Equations (1) and (2) may be formulated in terms of total lighting distance, lighting threshold, lighting levels, a total number of lighting levels, a lighting adjustment factor, lighting adjustment direction, number of lighting levels within a threshold, and/or a master lighting level.

Figure 2:
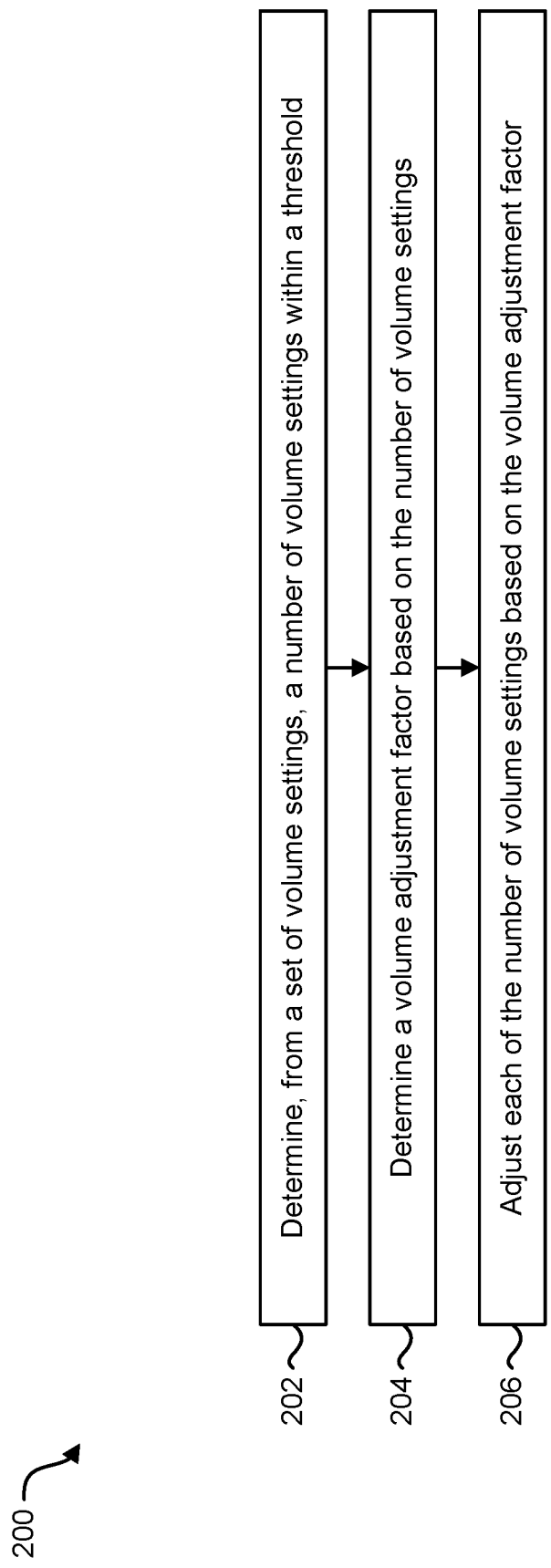
FIG. 2 is a flow diagram illustrating one configuration of a method for controlling volume.

FIG. 2 is a flow diagram illustrating one configuration of a method 200 for controlling volume. In some configurations, the method 200 may be performed by the electronic device 102 described in connection with FIG. 1 or another device. The electronic device 102 may determine 202, from a set of volume settings, a number of volume settings within a threshold. This may be accomplished as described in connection with FIG. 1. For example, the electronic device 102 may count a number of volume settings (from the set of volume settings) that are not at the threshold.

The electronic device 102 may determine 204 a volume adjustment factor based on the number of volume settings. This may be accomplished as described in connection with FIG. 1. For example, the electronic device 102 may increase the magnitude of the volume adjustment factor as the number of volume settings within the threshold decreases. In some configurations, the electronic device 102 may determine 204 the volume adjustment factor in accordance with Equation (2) above.

The electronic device 102 may adjust 206 each of the number of volume settings based on the volume adjustment factor. This may be accomplished as described in connection with FIG. 1. For example, the electronic device 102 may send volume adjustment commands in accordance with updated volume settings determined based on the adjustment factor, the master volume setting adjustment, and the previous volume settings. For instance, the electronic device 102 may multiply the master volume setting adjustment by the adjustment factor and add the product to the previous volume settings.

Figure 3:
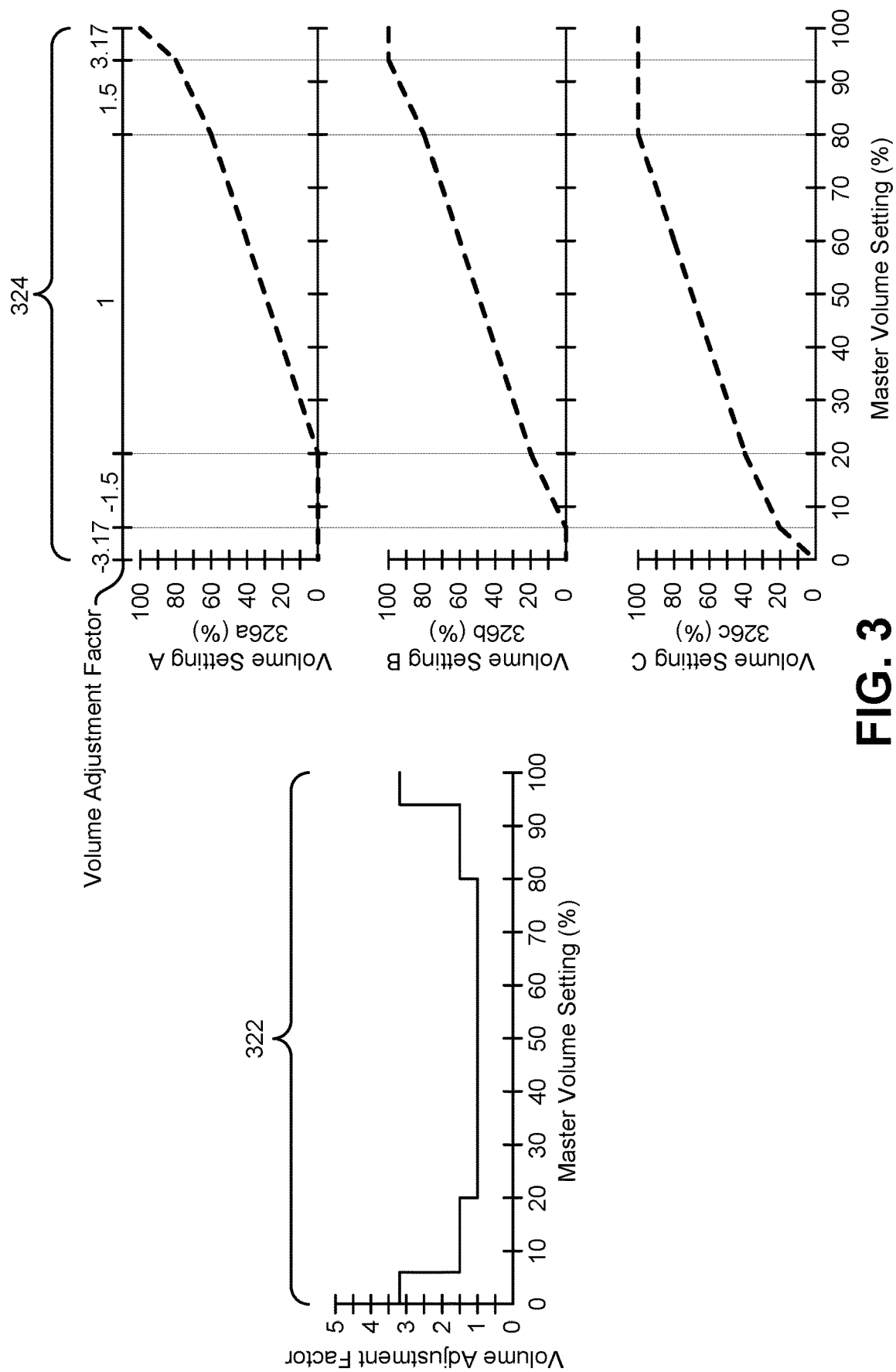
FIG. 3 is a diagram illustrating a first plot of a volume adjustment factor and second plots of volume settings.

FIG. 3 is a diagram illustrating a first plot 322 of a volume adjustment factor and second plots 324 of volume settings 326a-c. In particular, FIG. 3 illustrates examples of volume settings 326a-c relative to a master volume setting in accordance with some configurations of the systems and methods described herein. The first plot 322 is illustrated with the volume adjustment factor (e.g., a numerical value) on the vertical axis with a master volume setting on the horizontal axis (in percentage). The second plots 324 are illustrated with the master volume setting on the horizontal axes (in percentage). The second plots 324 also illustrate volume settings 326a-c corresponding to different remote devices (e.g., and/or different areas) on the vertical axes (in percentages). Varying values of the volume adjustment factor are also illustrated relative to ranges of the second plots 324. In some examples, the master volume setting may be represented by and/or adjusted with a user interface control, such as a slider control.

In the examples of FIG. 3, assume a lower threshold of 0 and an upper threshold of 100. The master volume setting may move 100 ticks or 100 percentage points to travel from the lower threshold to the upper threshold and vice versa. While none of the individual volume settings have reached either the lower or upper thresholds, each tick that the master volume setting moves will change the volume settings of all remote devices by one percentage point. In this way, all remote devices may change volume uniformly. The volume adjustment factor varies when a volume setting reaches one of the thresholds. For this example, assume that volume setting A 326a is initially set to 30%, that volume setting B 326b is initially set to 50%, that volume setting C 326c is initially set to 70%, and that the master volume setting is initially at 50%. When the master volume setting is increased from 50% to 80%, volume setting C 326c reaches the threshold at 100%, volume setting B 326b reaches 80%, and volume setting A 326a reaches 60%. At this point, the master volume setting has 20 ticks to reach the threshold of 100% and volume setting A 326a at 60% still needs 40 ticks to reach the threshold. In accordance with some configurations of the systems and methods disclosed herein, the electronic device 102 may calculate a new volume adjustment factor (1.5 in this example) to change volume setting A 326a and volume setting B 326b uniformly for each tick of the master volume setting. Accordingly, each tick of the master volume setting will change volume settings A-B 326a-b more rapidly and uniformly (since volume settings A-B 326a-b change by the same amount).

At this point in this example, and in accordance with Equation (2) above, the total volume distance (with volume settings 326a-c at 60%, 80%, and 100%) to the upper threshold is 40+20+0=60, the number of volume settings within the threshold is 2, the adjustment direction is +1, the threshold is 100 (since the master volume setting is increasing toward the upper threshold), and the master volume setting is 80. Accordingly, the volume adjustment factor is 1.5 at this point. Volume settings A-B 326a-b may continue to be increased until volume setting B 326b reaches the threshold. At this point, the volume adjustment factor may be re-calculated to approximately 3.17. Volume setting A 326a may then continue to be increased until volume setting A 326a reaches the threshold. At this point, all of the volume settings (and the master volume setting) have reached the threshold at 100. Accordingly, all of the volume settings (and the master volume setting) may be aligned by moving the master volume setting to a threshold. It should be noted that in a case that the volume direction is reversed after the volume adjustment factor has changed, the threshold may switch to the lower threshold of 0 and/or the volume adjustment factor may be reset to 1 (assuming that none of the volume settings are at the lower threshold). In some configurations, if the spacing between volume settings (of different remote devices, for example) have changed, the new spacing may be maintained when volume direction is reversed (until one of the volume settings reaches a threshold, for instance).

Figure 4:
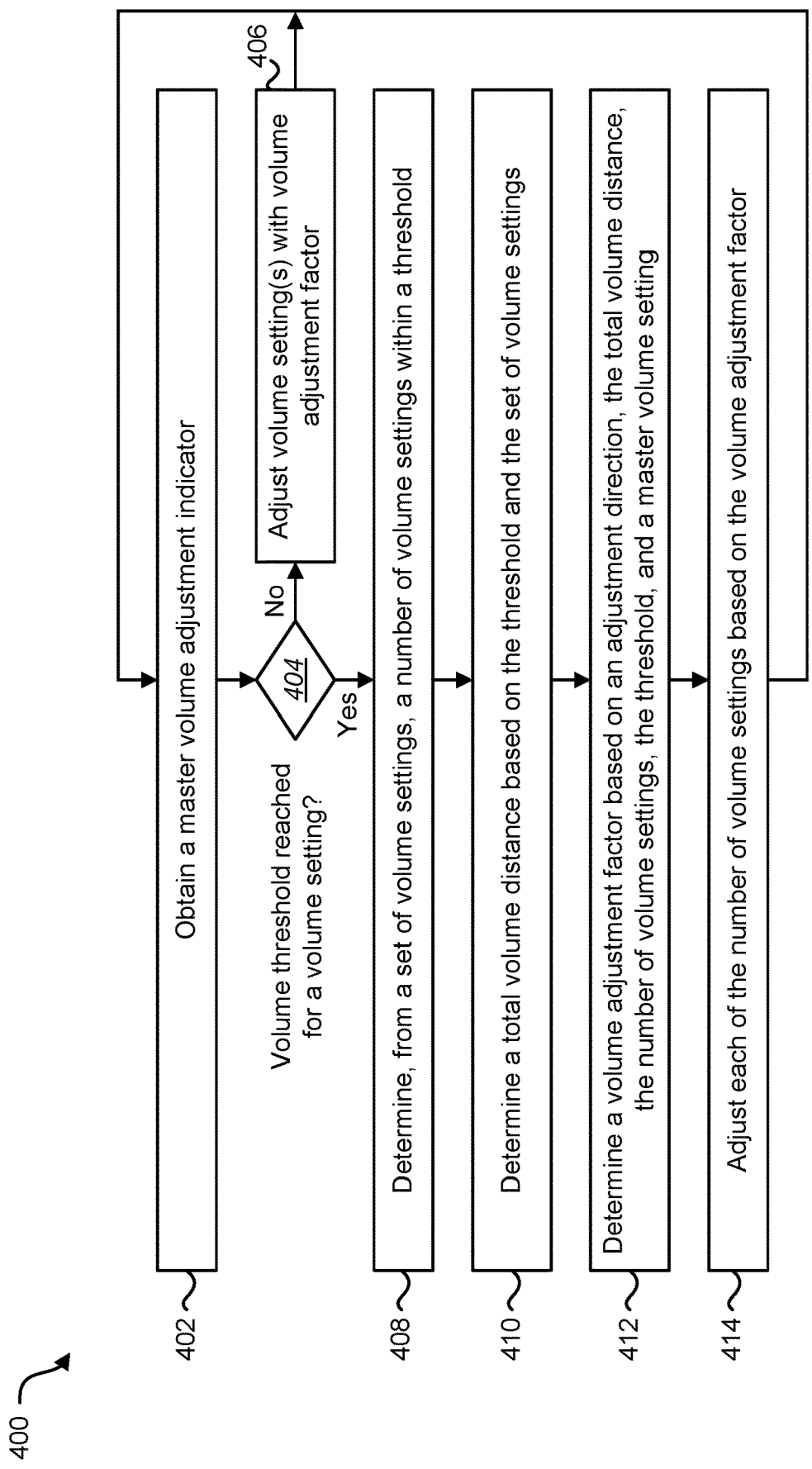
FIG. 4 is a flow diagram illustrating a more specific configuration of a method for controlling volume.

FIG. 4 is a flow diagram illustrating a more specific configuration of a method 400 for controlling volume. In some configurations, the method 400 may be performed by the electronic device 102 described in connection with FIG. 1 or another device. The electronic device 102 may obtain 402 a master volume adjustment indicator. This may be accomplished as described in connection with FIG. 1. For example, the electronic device 102 may receive a master volume adjustment indictor from a control device and/or may obtain a master volume adjustment indicator based on a received input.

The electronic device 102 may determine 404 whether a volume threshold is reached for a volume setting (e.g., for one or more of the remote devices 116a-n). This may be accomplished as described in connection with FIG. 1. For example, electronic device 102 may determine whether the master volume adjustment indicator will cause one or more of the volume settings to reach the volume threshold. In a case that the volume threshold is not reached, the electronic device 102 may adjust 406 one or more volume settings (e.g., volume setting(s) not at the threshold) with the volume adjustment factor (e.g., current volume adjustment factor). This may be accomplished as described in connection with FIG. 1.

In a case that the volume threshold is reached, the electronic device 102 may determine 408, from a set of volume settings, a number of volume settings within a threshold. This may be accomplished as described in connection with FIG. 1.

The electronic device 102 may determine 410 a total volume distance based on the threshold and the set of volume settings. This may be accomplished as described in connection with FIG. 1. For example, the electronic device 102 may add the volume distances for all of the volume settings (or for the volume settings within the threshold) to produce the total volume distance. In some configurations, this may be accomplished in accordance with Equation (1).

The electronic device 102 may determine 412 a volume adjustment factor based on an adjustment direction, the total volume distance, the number of volume settings (within the threshold), the threshold, and the master volume setting. This may be accomplished as described in connection with FIG. 1. For example, the electronic device 102 may determine 412 the volume adjustment factor in accordance with Equation (2) above.

The electronic device 102 may adjust 414 each of the number of volume settings based on the volume adjustment factor. This may be accomplished as described in connection with FIG. 1. For example, the electronic device 102 may adjust 414 each of the number of volume settings within the threshold based on the adjustment factor, while any of the volume settings at the threshold may not be adjusted. In some configurations, the electronic device 102 may send volume adjustment commands in accordance with updated volume settings determined based on the adjustment factor, the master volume setting adjustment, and the previous volume settings. For instance, the electronic device 102 may multiply the master volume setting adjustment by the adjustment factor and add the product to the previous volume settings. As illustrated in FIG. 4, the method 400 may repeat. For example, the method 400 may be performed for each master volume setting adjustment, for each increment of a master volume setting adjustment, and/or repetitively during volume adjustment.

Figure 5:
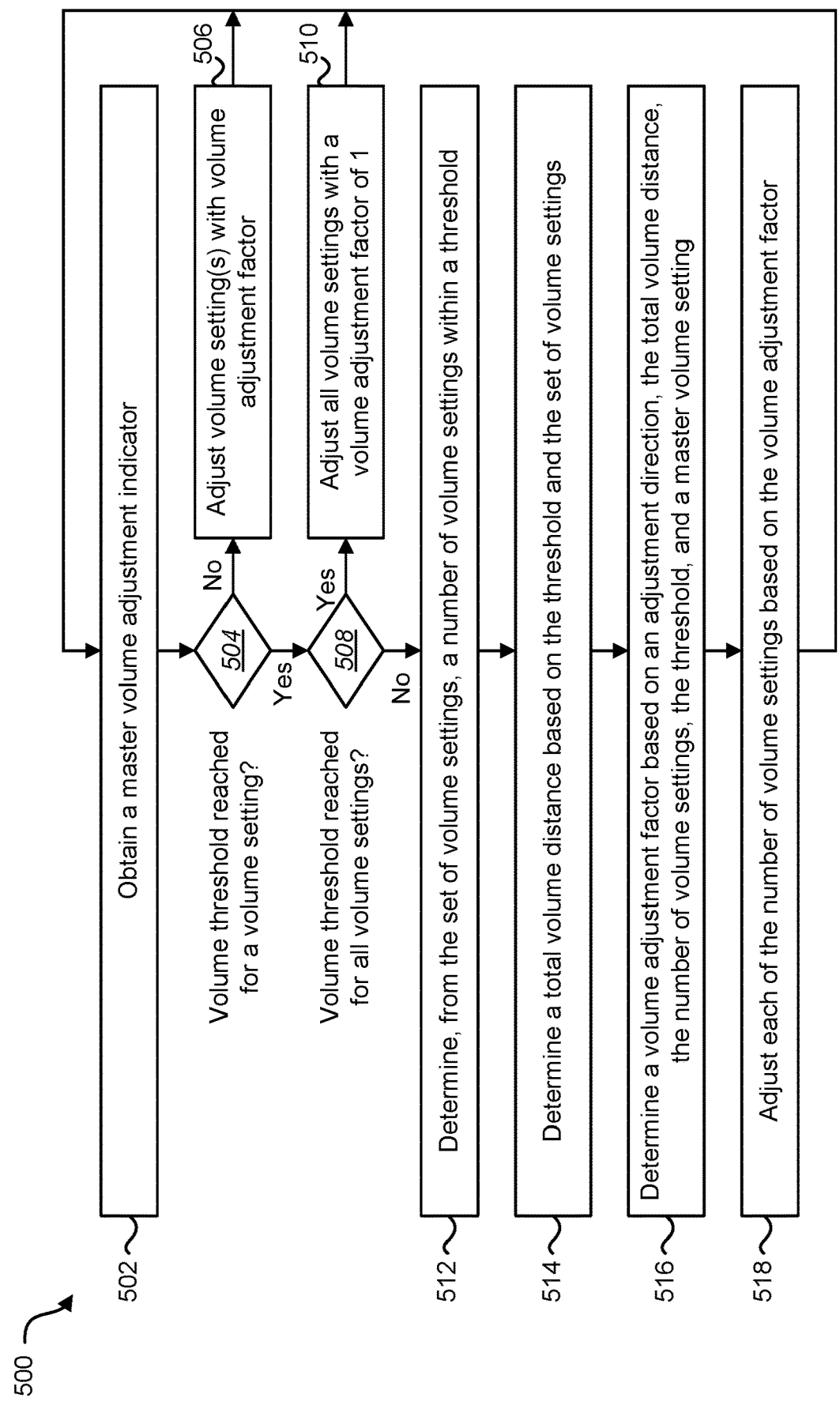
FIG. 5 is a flow diagram illustrating another more specific configuration of a method for controlling volume.

FIG. 5 is a flow diagram illustrating another more specific configuration of a method 500 for controlling volume. In some configurations, the method 500 may be performed by the electronic device 102 described in connection with FIG. 1 or another device. The electronic device 102 may obtain 502 a master volume adjustment indicator. This may be accomplished as described in connection with one or more of FIGS. 1 and 4.

The electronic device 102 may determine 504 whether a volume threshold is reached for a volume setting (e.g., for one or more of the remote devices 116a-n). This may be accomplished as described in connection with one or more of FIGS. 1 and 4. In a case that the volume threshold is not reached, the electronic device 102 may adjust 506 one or more volume settings (e.g., volume setting(s) not at the threshold) with the volume adjustment factor (e.g., current volume adjustment factor). This may be accomplished as described in connection with one or more of FIGS. 1 and 4.

In a case that the volume threshold is reached, the electronic device 102 may determine 508 whether the volume threshold is reached for all volume settings. This may be accomplished as described in connection with FIG. 1. For example, the electronic device 102 may determine whether all of the volume settings in the set of volume settings are equal to the threshold. In a case that the volume threshold has been reached for all volume settings, the electronic device 102 may adjust 510 all volume settings with a volume adjustment factor of one. This may be accomplished as described in connection with FIG. 1. For example, the volume adjustment factor may be set to one, and volume adjustments beyond the threshold may be performed with a volume adjustment factor of one.

In a case that the volume threshold has not been reached for all volume settings, the electronic device 102 may determine 512, from the set of volume settings, a number of volume settings within a threshold. This may be accomplished as described in connection with one or more of FIGS. 1 and 4.

The electronic device 102 may determine 514 a total volume distance based on the threshold and the set of volume settings. This may be accomplished as described in connection with one or more of FIGS. 1 and 4.

The electronic device 102 may determine 516 a volume adjustment factor based on an adjustment direction, the total volume distance, the number of volume settings (within the threshold), the threshold, and the master volume setting. This may be accomplished as described in connection with one or more of FIGS. 1 and 4.

The electronic device 102 may adjust 518 each of the number of volume settings based on the volume adjustment factor. This may be accomplished as described in connection with one or more of FIGS. 1 and 4. As illustrated in FIG. 5, the method 500 may repeat. For example, the method 500 may be performed for each master volume setting adjustment, for each increment of a master volume setting adjustment, and/or repetitively during volume adjustment.

Figure 6:
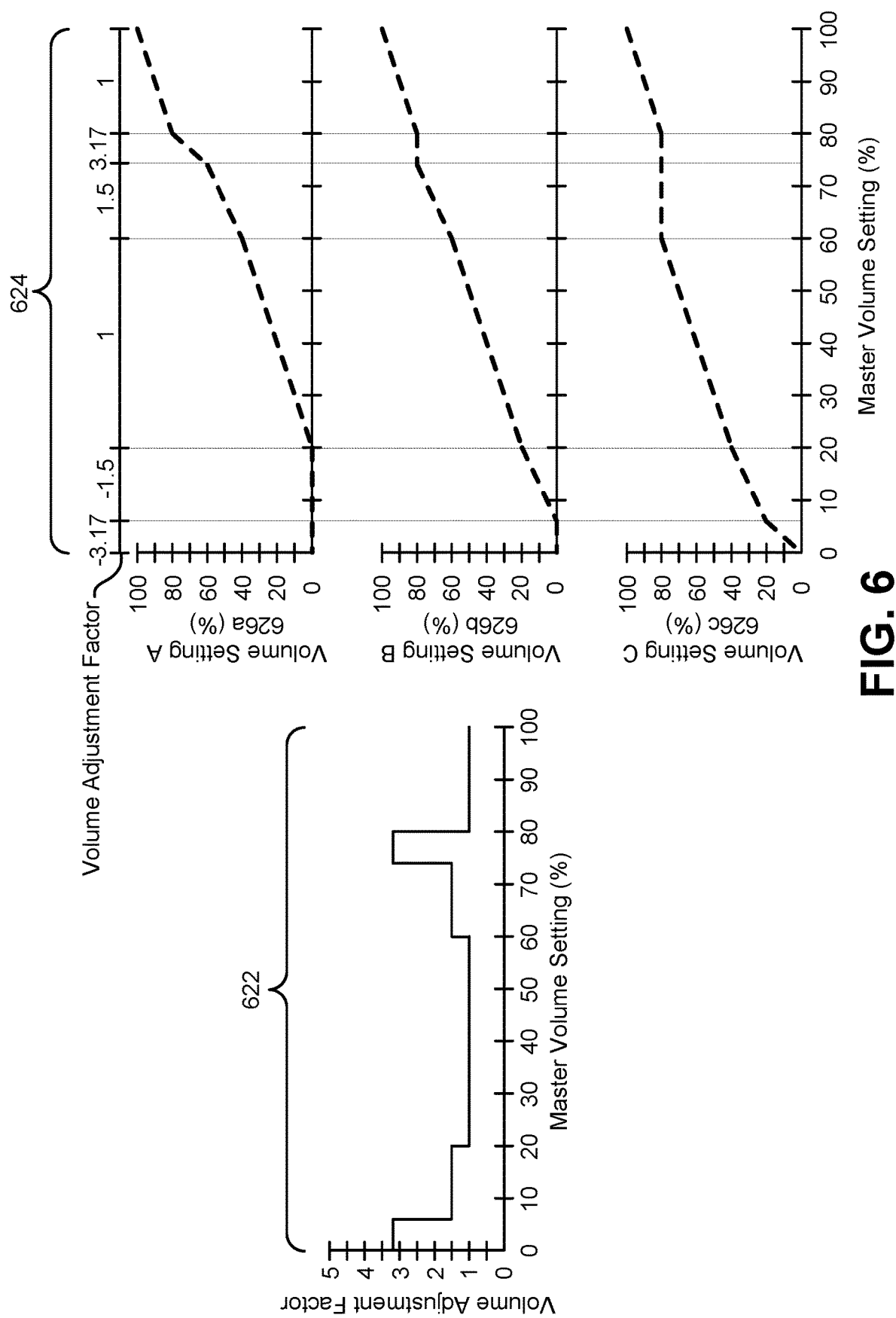
FIG. 6 is a diagram illustrating another first plot of a volume adjustment factor and second plots of volume settings.

FIG. 6 is a diagram illustrating another first plot 622 of a volume adjustment factor and second plots 624 of volume settings 626a-c. In particular, FIG. 6 illustrates examples of volume settings 626a-c relative to a master volume setting in accordance with some configurations of the systems and methods described herein. The first plot 622 is illustrated with the volume adjustment factor (e.g., a numerical value) on the vertical axis with a master volume setting on the horizontal axis (in percentage). The second plots 624 are illustrated with the master volume setting on the horizontal axes (in percentage). The second plots 624 also illustrate volume settings 626a-c corresponding to different remote devices (e.g., and/or different areas) on the vertical axes (in percentages). Varying values of the volume adjustment factor are also illustrated relative to ranges of the second plots 624. In some examples, the master volume setting may be represented by and/or adjusted with a user interface control, such as a slider control.

In the examples of FIG. 6, assume a lower threshold of 0 and an upper threshold of 80. For example, the upper threshold may be set to 80 to guard against damaging speakers. For instance, assume that a user is in a room where the volume is 30% and wants to increase the volume by 30 ticks. Assume that there is another room set at 70% volume. In other approaches, the other room where the volume is set to 70% would increase to 100%, possibly damaging the speakers. However, if the user is in the room that was at 30%, the user may not even be aware of damaging the speakers in the other room due to distance. In accordance with some configurations of the systems and methods disclosed herein, however, if the upper threshold is set at 80%, the volume of all devices may peak out at 80%, thus avoiding damage to the speakers.

For this example, assume that volume setting A 626a is initially set to 30%, that volume setting B 626b is initially set to 50%, that volume setting C 626c is initially set to 70%, and that the master volume setting is initially at 50%, with a threshold of 80%. When the master volume setting is increased from 50% to 60%, volume setting C 626c reaches the threshold at 80%, volume setting B 626b reaches 60%, and volume setting A 626a reaches 40%. In accordance with some configurations of the systems and methods disclosed herein, the electronic device 102 may calculate a new volume adjustment factor (1.5 in this example) to change volume setting A 626a and volume setting B 626b uniformly for each tick of the master volume setting. Accordingly, each tick of the master volume setting will change volume settings A-B 626a-b more rapidly and uniformly (since volume settings A-B 626a-b change by the same amount) until the master volume setting reaches approximately 74%.

At this point, the volume adjustment factor may be re-calculated to approximately 3.17. Volume setting A 626a may then continue to be increased until volume setting A 626a reaches the threshold. At this point, all of the volume settings (and the master volume setting) have reached the threshold at 80. Accordingly, all of the volume settings (and the master volume setting) may be aligned.

Some configurations of the systems and methods described herein may allow adjusting the volume beyond the threshold once all of the volume settings have reached the threshold (e.g., conditional threshold). For example, if a user wants to continue increasing the volume beyond 80%, all of the volume settings may proceed in alignment with the master volume setting. For instance, as the master volume increases beyond 80%, each volume setting may increase equally (by one tick per tick of the master volume setting). This approach may avoid the risk of having one remote device reach 100% volume while another remote device is much lower. This approach may also make the user more aware that the devices are reaching 100% volume level. It should be noted that in a case that the volume direction is reversed after the volume adjustment factor has changed, the threshold may switch to the lower threshold of 0 and/or the volume adjustment factor may be reset to 1 (assuming that none of the volume settings are at the lower threshold).

Figure 7:
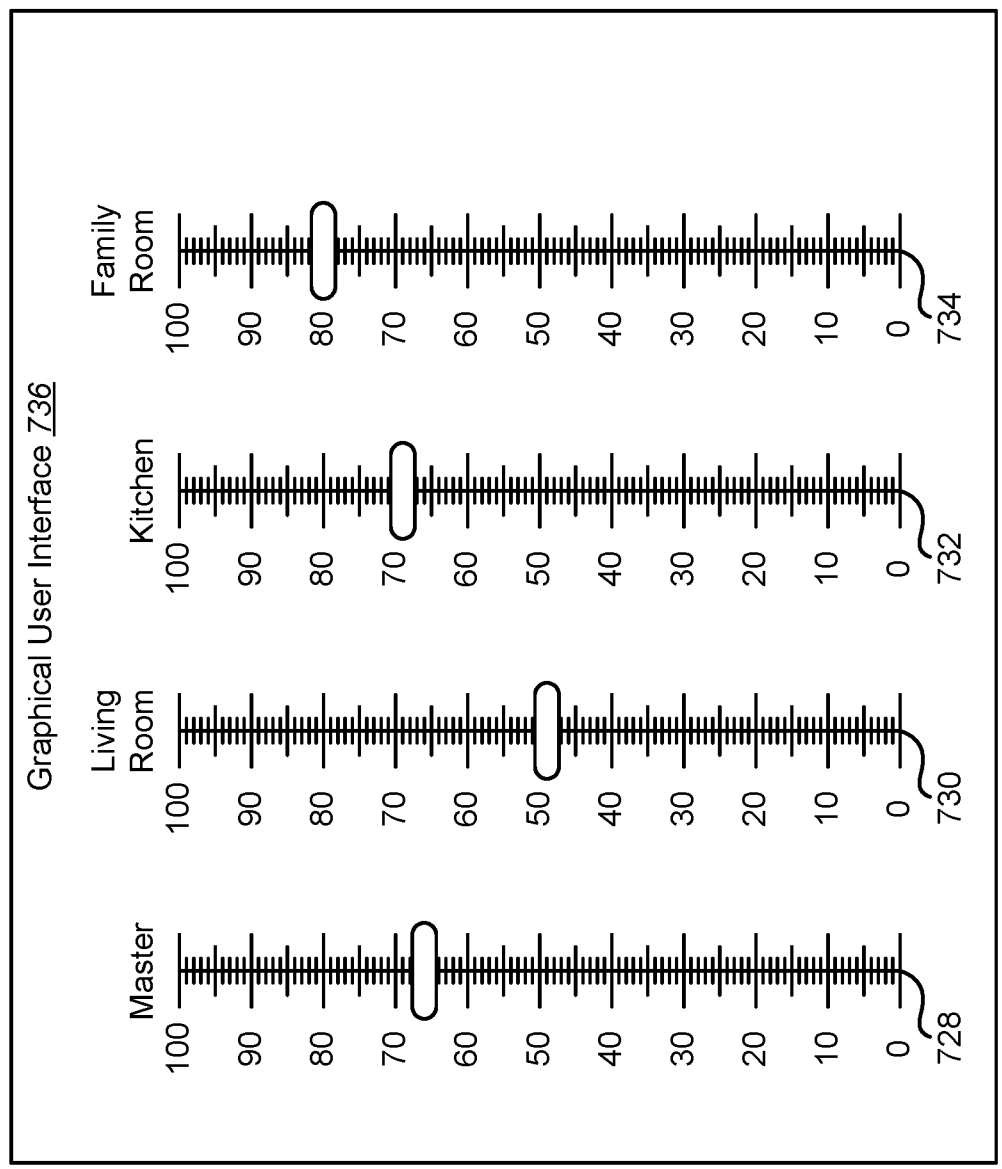
FIG. 7 is a diagram illustrating an example of a graphical user interface.

FIG. 7 is a diagram illustrating an example of a graphical user interface 736. The graphical user interface 736 is one example of the user interfaces described herein. For example, the graphical user interface 736 may be presented on a smartphone display, a tablet device display, a control panel display, or another display. In this example, the graphical user interface 736 includes a master slider 728, a living room slider 730, a kitchen slider 732, and a family room slider 734. In some examples, the electronic device 102 described in connection with FIG. 1 may obtain one or more volume adjustment indicators via the graphical user interface 736.

As illustrated in the example of FIG. 7, the living room slider 730 may be associated with a remote device that controls volume in a living room, the kitchen slider 732 may be associated with a remote device that controls volume in a kitchen, and the family room slider 734 may be associated with a remote device that control volume in a family room. In some examples, living room slider 730, the kitchen slider 732, and/or the family room slider 734 may be individually adjustable from the graphical user interface 736 to adjust corresponding volume settings. Additionally or alternatively, the living room slider 730, the kitchen slider 732, and/or the family room slider 734 may be set based on information received from remote devices corresponding to the living room, kitchen, and/or family room.

The master slider 728 may be adjustable in accordance with the systems and methods disclosed herein. For example, a master volume setting indicator may be obtained via the graphical user interface 736 and utilized to adjust the volume settings corresponding to the living room, kitchen, and/or family room. In this example, the threshold is set to 80. Accordingly, the family room slider 734 is at the threshold and may remain at the threshold (with increasing master volume setting) until the living room slider 730 and the kitchen slider 732 reach the threshold. In this example, the master slider 728 is at 66, the living room slider 730 is at 49, the kitchen slider is at 69, and the family room slider is at 80 in accordance with the example provided in connection with FIG. 6. With an increasing master volume setting, the sliders 728, 730, 732, 734 may converge at 80 and may increase at the same rate beyond 80 to 100. With a decreasing master volume setting, the volume adjustment factor may be set (e.g., reset after an increasing master volume setting) to 1 and the sliders 728, 730, 732, 734 may decrease together until the living room slider 730 reaches 0. At that point, the volume adjustment factor may be recalculated and applied to a further volume decrease.

Figure 8:
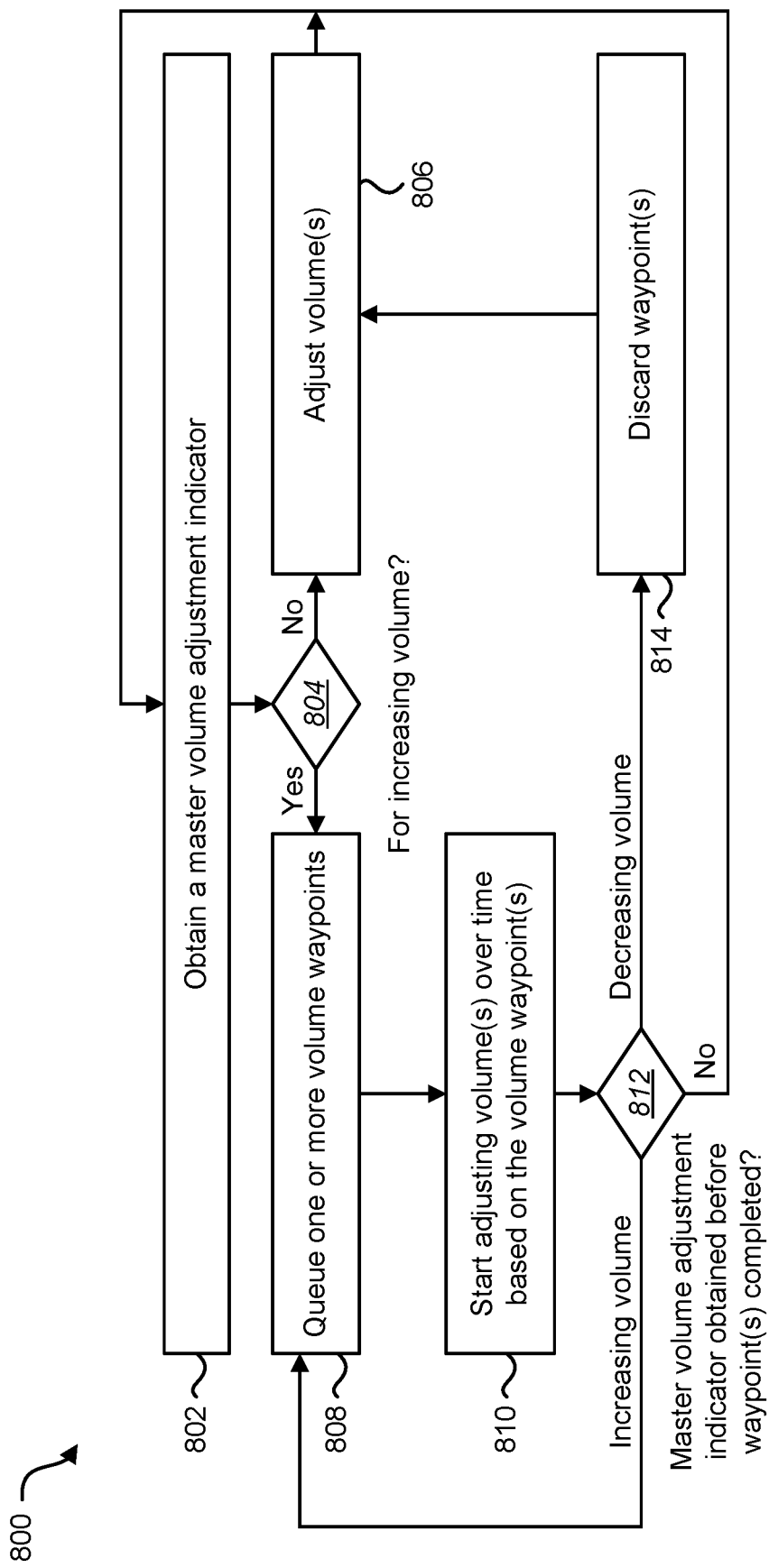
FIG. 8 is a flow diagram illustrating another configuration of a method for controlling volume.

FIG. 8 is a flow diagram illustrating another configuration of a method 800 for controlling volume. In some configurations, the method 800 may be performed by the electronic device 102 described in connection with FIG. 1 or another device. In some configurations, the method 800 described in connection with FIG. 8 may be performed in conjunction with one or more of the other methods 200, 400, 500 described herein. The electronic device 102 may obtain 802 a master volume adjust indicator. This may be accomplished as described in connection with one or more of FIGS. 1, 4, and 5.

The electronic device 102 may determine 804 whether the volume adjustment indicator is for an increasing volume. For example, the electronic device 102 may determine whether the master volume adjustment indicator indicates a volume greater than a current volume. In a case that the master volume adjustment indicator is not for increasing volume (e.g., it is for decreasing volume), the electronic device 102 may adjust 806 one or more volumes. For example, the electronic device 102 may adjust volume(s) of one or more remote devices in accordance with the master volume adjustment indicator (and the volume adjustment factor, for instance).

In a case that the master volume adjustment indicator is for increasing volume, the electronic device 102 may queue one or more volume waypoints. This may be accomplished as described in connection with FIG. 1. For example, the electronic device 102 may set a volume waypoint for one or more increments of the volume settings. For instance, the electronic device 102 may set a volume waypoint for each 1% increment, 2% increment, 3% increment, 5% increment, etc., of each volume setting (for each remote device, for instance). A volume waypoint may be a potential volume adjustment increment that may be implemented over time.

The electronic device 102 may start 810 adjusting volume(s) over time based on the volume waypoint(s). For example, the electronic device 102 may start sending volume commands to the remote device(s) in accordance with the volume waypoint(s) over time. For instance, assume that an overall volume adjustment for a remote device is a 20% increase with volume waypoints at a 5% increase, 10% increase, 15% increase, and/or a 20% increase. If the volume increase rate is limited to 20% per second, the electronic device 102 may be scheduled to send volume adjustment commands of the 5% increase at 0.25 seconds, the 10% increase at 0.5 seconds, the 15% increase at 0.75 seconds, and the 20% increase at 1 second. If no further adjustment to the volume setting(s) (e.g., master volume setting) is made, then the full 20% volume increase will occur after approximately 1 second.

The electronic device 102 may determine 812 whether another master volume adjustment indicator is obtained before the waypoint(s) is or are completed (e.g., before all of the waypoint(s) are implemented). For example, the electronic device 102 may determine whether there are any waypoints in the queue when another master volume adjustment indicator is obtained (from an input and/or another device, for instance). In a case that no other master volume adjustment indicator is obtained before the volume waypoint(s) is or are completed, the electronic device 102 may return to await obtaining 802 another master volume adjustment indicator. In a case that another master volume adjustment indicator is obtained before the waypoint(s) are completed and the master volume adjustment indicator is for increasing volume, the electronic device 102 may return to queue 808 one or more addition volume waypoints.

In a case that another master volume adjustment indicator is obtained before the waypoint(s) are completed and the master volume adjustment indicator is for decreasing volume, the electronic device 102 may discard 814 one or more waypoint(s) (e.g., one or more waypoints that have not yet been implemented). In some approaches, the electronic device 102 may discard all remaining waypoint or waypoint(s) and directly adjust 806 the volume(s) in accordance with the new volume setting(s) corresponding to the master volume adjustment indicator. In some approaches, the electronic device 102 may discard the volume waypoint or waypoints that exceed the new volume settings. For example, the electronic device 102 may discard 814 any waypoint or waypoints that are greater than the new lower volume setting corresponding to the master volume adjustment indicator for a decreasing volume. The electronic device 102 may then adjust 806 the volume(s).

For example, if the master volume slider is dragged to a lower volume value while there are still waypoints in the queue, the waypoints may be thrown out and the remote devices may be immediately commanded to the lower volume settings. Some configurations of the systems and methods described herein may allow a user to accidentally drag the master volume setting to 100% and then immediately correct by dragging to a lesser volume, which may avoid the remote devices being commanded to the 100% volume level. Some configurations may also provide a simple and immediate way to silence all remote devices by quickly dragging the master volume slider to zero (without waypoints being considered for decreasing volume, for instance).

Figure 9:
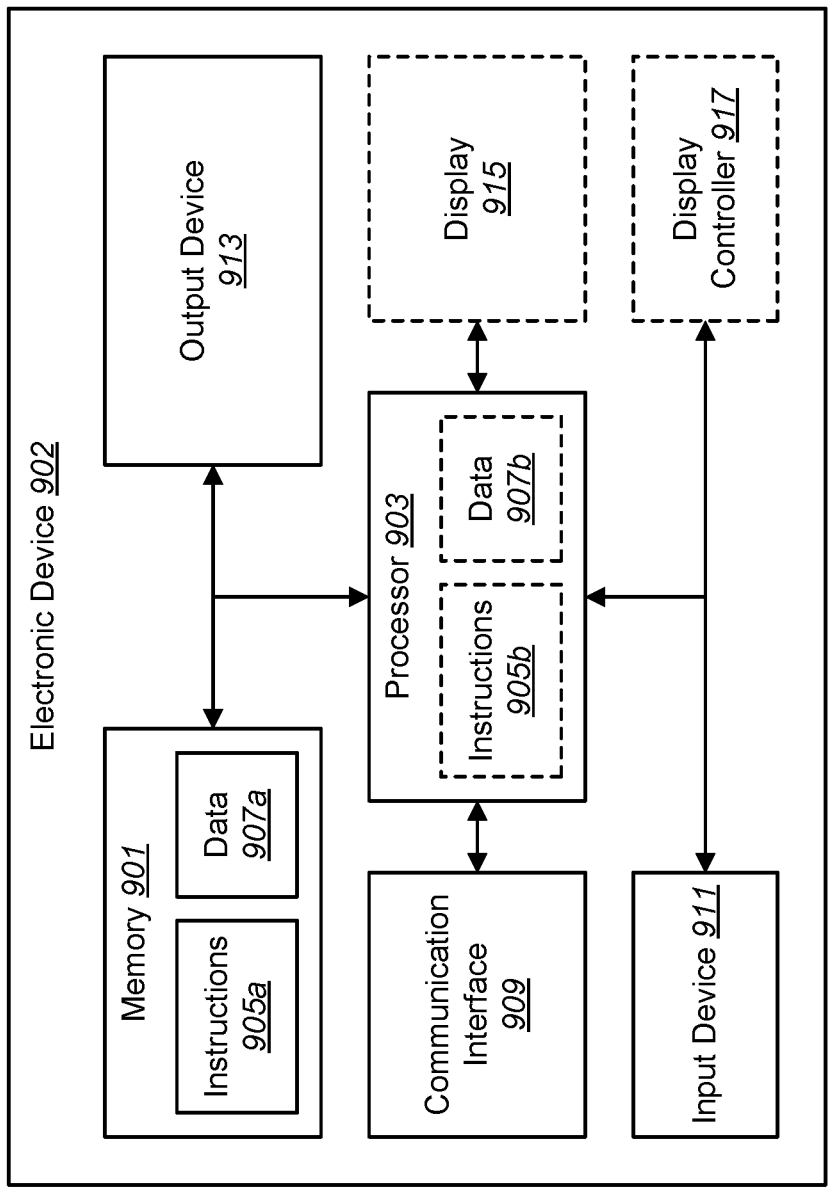
FIG. 9 illustrates various components that may be utilized in an electronic device.

FIG. 9 illustrates various components that may be utilized in an electronic device 902. The electronic device 902 described in connection with FIG. 9 may be configured in accordance with one or more of the devices (e.g., electronic device 102, remote device 116, control device, etc.) described herein. For example, the electronic device 902 may be configured to perform one or more of the methods 200, 400, 500, 800 described herein. The electronic device 902 may include a memory 901, a communication interface 909, an input device 911, a processor 903, an output device 913, a display 915, and/or a display controller 917. The memory 901 may store instructions 905*a* and data 907*a*. The processor 903 may operate on instructions 905*b* and data 907*b*. It should be noted that the display 915 and/or display controller 917 may be optional. For example, some configurations of the electronic device 902 may not have a display. Additionally or alternatively, some configurations of the electronic device 902 may include a button interface (e.g., an input device 911). Some configurations of the electronic device 902 may be controlled by a control device (e.g., a touch panel, smart phone, etc.) with communication through a wired or wireless link (e.g., WLAN).

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory may be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. An electronic device for controlling volume, comprising:
   a processor;
   a memory in electronic communication with the processor;
   instructions stored in the memory, the instructions being executable by the processor to:

determine, from a set of volume settings, a number of volume settings within a threshold;

determine a volume adjustment factor based on the number of volume settings; and adjust each of the number of volume settings based on the volume adjustment factor.

2. The electronic device of claim 1, wherein the instructions are further executable by the processor to determine a total volume distance based on the threshold and the set of volume settings.

3. The electronic device of claim 2, wherein the instructions are executable to determine the volume adjustment factor based on the total volume distance.

4. The electronic device of claim 1, wherein the number of volume settings includes any of the set of volume settings that is not at the threshold.

5. The electronic device of claim 1, wherein the number of volume settings is a number of areas with remote devices that are not set at the threshold.

6. The electronic device of claim 1, wherein the volume adjustment factor is uniform for the number of volume settings.

7. The electronic device of claim 1, wherein the instructions are further executable to allow the set of volume settings to move beyond the threshold only after all of the set of volume settings have arrived at the threshold.

8. The electronic device of claim 1, wherein the instructions are executable to limit a rate of volume increase over time.

9. The electronic device of claim 1, wherein the instructions are executable to:

queue one or more volume waypoints for an increasing volume indicator; and discard at least one of the one or more volume waypoints and set a lower volume in response to a volume indicator that is lower than the at least one of the one or more volume waypoints.

10. The electronic device of claim 1, wherein the instructions are executable to determine the volume adjustment factor in accordance with an equation $$X = D * \left( \frac{T_D}{n_T * (V_T - V_M)} \right),$$

wherein X is the volume adjustment factor, D is an adjustment direction, $T_D$ is a total volume distance, $n_T$ is the number of volume settings within the threshold, $V_T$ is the threshold, and $V_M$ is a master volume setting.

11. A method for controlling volume, comprising:

determining, from a set of volume settings, a number of volume settings within a threshold;

determining a volume adjustment factor based on the number of volume settings; and adjusting each of the number of volume settings based on the volume adjustment factor.

12. The method of claim 11, further comprising determining a total volume distance based on the threshold and the set of volume settings.

13. The method of claim 12, wherein the volume adjustment factor is determined based on the total volume distance.

14. The method of claim 11, further comprising allowing the set of volume settings to move beyond the threshold only after all of the set of volume settings have arrived at the threshold.

15. The method of claim 11, further comprising limiting a rate of volume increase over time.

16. A non-transitory computer-readable medium for controlling volume, the computer-readable medium comprising executable instructions for:

determining, from a set of volume settings, a number of volume settings within a threshold;

determining a volume adjustment factor based on the number of volume settings; and adjusting each of the number of volume settings based on the volume adjustment factor.

17. The computer-readable medium of claim 16, further comprising executable instructions for determining a total volume distance based on the threshold and the set of volume settings.

18. The computer-readable medium of claim 17, further comprising executable instructions for determining the volume adjustment factor based on the total volume distance.

19. The computer-readable medium of claim 16, further comprising executable instructions for allowing the set of volume settings to move beyond the threshold only after all of the set of volume settings have arrived at the threshold.

20. The computer-readable medium of claim 16, further comprising executable instructions for limiting a rate of volume increase over time.

* * * * *